United States Patent
Macrae et al.

(10) Patent No.: US 9,602,570 B2
(45) Date of Patent: Mar. 21, 2017

(54) AIRCRAFT ENTERTAINMENT SYSTEM

(75) Inventors: James Macrae, Dunfermline (GB); Murray Skelton, Dunfermline (GB)

(73) Assignee: BLUEBOX AVIONICS LIMITED, London (GB)

( * ) Notice: Subject to any disclaimer, the term of this patent is extended or adjusted under 35 U.S.C. 154(b) by 1168 days.

(21) Appl. No.: 13/319,734

(22) PCT Filed: May 11, 2010
(Under 37 CFR 1.47)

(86) PCT No.: PCT/GB2010/000945
§ 371 (c)(1),
(2), (4) Date: Oct. 8, 2012

(87) PCT Pub. No.: WO2010/130992
PCT Pub. Date: Nov. 18, 2010

(65) Prior Publication Data
US 2013/0031215 A1    Jan. 31, 2013

(30) Foreign Application Priority Data
May 11, 2009  (GB) .................................. 0908038.3

(51) Int. Cl.
*G06F 15/16*    (2006.01)
*H04L 29/06*    (2006.01)
(Continued)

(52) U.S. Cl.
CPC .......... *H04L 65/80* (2013.01); *H04L 12/1868* (2013.01); *H04L 67/06* (2013.01)

(58) Field of Classification Search
None
See application file for complete search history.

(56) References Cited

U.S. PATENT DOCUMENTS 7,450,600 B2    11/2008  Crinon
2003/0016673 A1*  1/2003  Pendakur et al. ..... H04H 60/11
(Continued)

FOREIGN PATENT DOCUMENTS

EP    1901525    3/2008
GB    2466444    6/2010
(Continued)

OTHER PUBLICATIONS

International Preliminary Report on Patentability dated Nov. 15, 2011 in Application No. PCT/GB2010/000945.
(Continued)

*Primary Examiner* — Chris Parry
*Assistant Examiner* — Soe M Hlaing
(74) *Attorney, Agent, or Firm* — Snell & Wilmer L.L.P.

(57) ABSTRACT

A content distribution system comprises a server, a plurality of clients and means for distributing a plurality of items of content to the plurality of clients, wherein each client is configured to transmit at least one message to the server representative of portions of the items of content that are present or not present at that client, and the distribution means is configured to determine from the messages portions of the items of content that are missing from at least one client, and to distribute the missing portions of content to the clients according to a multicast protocol.

19 Claims, 9 Drawing Sheets

(51) Int. Cl.
*H04L 12/18* (2006.01)
*H04L 29/08* (2006.01)

(56) References Cited

U.S. PATENT DOCUMENTS

| | | |
|---|---|---|
| 2003/0206549 A1 | 11/2003 | Mody et al. |
| 2005/0026692 A1* | 2/2005 | Dyl .......................... A63F 13/12 |
| 2005/0132407 A1 | 6/2005 | Boyer et al. |
| 2006/0224763 A1* | 10/2006 | Altunbasak et al. ... H04L 69/14 |
| 2006/0267994 A1 | 11/2006 | Pfleging et al. |
| 2008/0133715 A1* | 6/2008 | Yoneda et al. ...... H04L 12/2821 |
| 2008/0313679 A1* | 12/2008 | Ryden et al. ...... H04N 7/17327 |
| 2009/0007194 A1* | 1/2009 | Brady et al. ............. H04N 7/10 |
| 2010/0162325 A1 | 6/2010 | Bonar |
| 2010/0162326 A1 | 6/2010 | Bonar |
| 2010/0162327 A1 | 6/2010 | Bonar |

FOREIGN PATENT DOCUMENTS

| | | |
|---|---|---|
| GB | 2466445 | 6/2010 |
| WO | 2004073199 | 8/2004 |
| WO | 2005125207 | 12/2005 |
| WO | 2006065381 | 6/2006 |
| WO | 2008011162 | 1/2008 |
| WO | 2008043092 | 4/2008 |

OTHER PUBLICATIONS

International Search Report and Written opinion for PCT/GB2010/000945 dated Nov. 10, 2010.

* cited by examiner

AIRCRAFT ENTERTAINMENT SYSTEM

CROSS-REFERENCE TO RELATED APPLICATIONS

This application is a U.S. national phase filing under 35 U.S.C. §371 of PCT/GB2010/000945 filed on May 11, 2010 and claims priority from United Kingdom Application No. GB 0908038.3, which was filed on May 11, 2009.

FIELD OF THE INVENTION

The present invention relates to a content distribution system and method, and in particular to an aircraft content distribution system and method for providing video and/or audio content to aircraft passengers.

BACKGROUND TO THE INVENTION

The provision of content distribution systems that provide in-flight entertainment to passengers have become increasingly important to airlines, as the choice of content available to passengers and the performance and reliability of such systems has a significant impact on the passenger's enjoyment of a flight and consequently has become an important factor for passengers in selecting an airline or flight.

Known aircraft content distribution systems comprise individual display units at each seat linked by wired network connections (for example via Ethernet connections) to a central server that stores all content available to passengers. An application running at the server provides menus of available content to each user, from which the user is able to select a piece of content to play. The selected content is then streamed in real time from the server to the user's display unit. Such known systems require powerful servers, and high bandwidth network connections that are able to distribute different content to every passenger on the aircraft simultaneously. The requirement for powerful servers and high bandwidth wired connections to each seat add significantly to the weight of the aircraft, which has significant cost and operational implications. Furthermore, as such systems form an integral part of the aircraft they must comply with high safety certification requirements.

Alternative known aircraft content distribution system stream content from the server to the display devices via wireless rather than wired network connections. However, wireless connections within aircraft can be unreliable due to the geometry of the aircraft, and signal reflection and cancellation effects within the confined space of the aircraft cabin. In order to address such issues, the power of the wireless transmissions may be increased, but it is difficult to scale such systems up for use in larger aircraft without power requirements becoming unfeasibly large. Furthermore, such known wireless systems are usually integrated with other aircraft systems, for example passenger service systems, and again must comply with high safety certification requirements One reason for integrating known aircraft content distribution systems with other aircraft systems, for example passenger service systems, and also for using a central server to stream content in real time, is to ensure that the cabin staff can control the streaming of content to the passengers, and can halt or pause the playing of content for instance in an emergency or to enable delivery messages over an intercom system. Installation and maintenance of such systems can be complex and expensive.

It is an aim of the present invention to provide an improved, or at least alternative, content distribution system.

SUMMARY OF THE INVENTION

In a first independent aspect of the invention there is provided a content distribution system comprising a server, a plurality of clients and means for distributing a plurality of items of content to the plurality of clients, wherein each client is configured to transmit at least one message to the server representative of portions of the items of content that are present or not present at that client, and the distribution means is configured to determine from the messages portions of the items of content that are missing from at least one client, and to distribute the missing portions of content to the clients according to a multicast protocol.

The use of a multicast protocol to distribute content has been found to be particularly efficient, and to reduce network traffic in comparison to unicast or other point-to-point protocols. That can be particularly important in an aircraft system where weight and thus performance constraints are severe. Multicast protocols are usually less reliable than unicast protocols, however by providing for determination of missing portions of items of content, and the distribution of the missing portions of content, the system can ensure that all data is received correctly whilst obtaining the benefits of using a multicast protocol.

The distribution means may comprise a processing resource, for example a suitably programmed processor, and associated wired or wireless transmission circuitry.

The system may be an aircraft content distribution system, the server may be installed in an aircraft comprising a plurality of passenger seats, and each client may be configured to output content to a respective output device associated with and/or viewable from at least one passenger seat.

The determination of the portions of the items of content that are missing may be an application layer process rather than a network layer process.

The distribution means may be configured to distribute content using a connectionless and/or unreliable protocol. The connectionless and/or unreliable protocol may be a connectionless and/or unreliable transport layer protocol. The protocol may be UDP/IP. Network traffic may be reduced further by using a connectionless and/or unreliable protocol. The determination of missing portions of items of content, for example in an application layer process, and the subsequent distribution or redistribution of any missing portions of content can ensure that all content is received correctly, despite the use of a connectionless and/or unreliable transport layer protocol.

The distribution means may be configured to distribute all of the missing portions of content to all of the clients. The distribution means may be configured to not distribute at least some and preferably all of those portions of items of content not identified as missing. Thus, the level of network traffic may be reduced.

The distribution means may be configured to construct a transport stream comprising the missing portions of content, and the distribution of the missing portions of content may comprise transmitting the transport stream to the clients. The transport steam may comprise a network layer transport stream. At least some and preferably all of those portions of items of content not identified as missing may be not included in the transport stream.

The distribution means may be configured to order the portions of content in the transport stream in dependence on the number of clients that are missing each portion of content.

The distribution means may be configured to transmit the transport stream according to a network layer transport protocol, and each client may be configured to receive and process the transport stream according to the network layer transport protocol thereby to extract the portions of the items of content, to perform an application layer process to identify portions of content that have or have not been received, and to transmit at least one further message representative of any remaining missing portions of content.

The distribution means may be configured to monitor for receipt of any further messages from the clients, to determine from the further messages any remaining missing portions of content and to redistribute the remaining missing portions of content to the clients.

The distribution means may be configured to construct a further transport stream comprising the remaining missing portions of content, and the redistribution of the remaining missing portions of content may comprise transmitting the further transport stream to the clients.

The distribution means may be configured to repeatedly monitor for receipt of any further messages and/or to repeatedly redistribute remaining missing portions of content.

The distribution means may be configured to repeatedly redistribute missing items of content until substantially no items of content are identified by the clients as being missing and/or until the expiry of a predetermined distribution period.

Each client may be configured to monitor whether it has received substantially all portions of content and to perform a further procedure in response to having received substantially all items of content.

Each client may be configured to perform the further procedure independently of whether one or more other of the clients have received substantially all portions of content and/or are ready to perform the further procedure.

Each client may be configured to perform the further procedure regardless of whether the distribution means is continuing to distribute missing portions of content.

The further procedure may be a procedure that is performed prior to the selection of one of the items of content and/or the provision of the selected item of content to the associated output device. The further procedure may comprise or be in preparation for entry into the local control mode. The further procedure may comprise a synchronisation and/or initialisation procedure.

The distribution means may be configured to provide at least one list of the portions of the items of content. The at least one list may comprise a separate list for each item of content or may comprise an amalgamated list for all of the items of content.

The server may be configured to transmit the at least one list to each client, each client may be configured to identify missing portions of content from the at least one list, and for each client the at least one message may comprise at least one identifier identifying missing portions of content.

Alternatively, the at least one message may comprise at least one identifier identifying portions of content that have been received and the distribution means is configured to identify the items of content that are missing by comparison between the identifiers and the list.

The server may be configured to transmit the at least one list using a connection-oriented and/or reliable protocol. The connection-oriented and/or reliable protocol may be a connection-oriented and/or reliable transport layer protocol. The protocol may be TCP/IP. The server may be configured to transmit the at least one list using a multicast protocol or a unicast protocol.

Each client may comprise a processor and a storage device for storage of the plurality of items of content, each client may associated with a respective at least one output device; and each client processor may be operable to provide a selected one of the stored plurality of items of content to the associated at least one display unit.

The server may comprise means for transmitting at least one instruction to the clients.

The instruction transmitting means may be configured to repeat the transmission of the at least one instruction during a transmission period, and each transmission of the at least one instruction may be separated from the next transmission of the at least one instruction by a respective time interval.

At least some of the durations of time intervals between transmissions of the at least one instruction may be different from each other.

In a further independent aspect of the invention there is provided a content distribution system for an aircraft comprising:—a server; a plurality of output devices; and a plurality of clients, each client being associated with a respective at least one output device, wherein the server comprises means for transmitting at least one instruction to the clients, and the instruction transmitting means is configured to repeat the transmission of the at least one instruction during a transmission period, and to separate each transmission of the at least one instruction from the next transmission of the at least one instruction by a respective time interval, and at least some of the durations of time intervals between transmissions of the at least one instruction are different from each other.

The instruction transmitting means may comprise a processing resource, for example a suitably programmed processor, and associated wired or wireless transmission circuitry.

The durations of the time intervals may be selected from a distribution and/or are selected using an algorithm. The durations of the time intervals may be substantially random.

The server may be configured to transmit at least one test message to the clients, to repeat the transmission of the at least one test message during a transmission period, wherein each transmission of the test message may be separated from the next transmission of the at least one instruction by a respective time interval, and each client may be configured to transmit a test message acknowledgement in response to receipt of a test message.

At least some of the durations of time intervals between transmissions of the test messages may be different from each other.

The server may be configured to vary at least one parameter of the test messages, or the durations of time intervals between the test messages, or at least one parameter of an algorithm that may be used to select the durations of the time intervals, to determine the effect of the variation on the rate of successful receipt of the test message by the clients, thereby to select the time intervals and/or the distribution and/or the algorithm used to determine the time intervals for transmission of the at least one instruction.

Thus, tuning of the time intervals or other parameters may be provided to provide an optimised rate of successful receipt of messages, such as instructions, by the clients.

The at least one instruction may comprise time data identifying a start time for performance of the at least one instruction. The start time may be after the end of the transmission period. The server may be configured to stream an item of content to the clients at or after the start time.

The at least one instruction may comprise an instruction to pause playing of content. The server may be configured to transmit an item of content and the at least one instruction comprises an instruction to play the item of content.

The instruction transmitting means may be configured to transmit the at least one instruction using a multicast protocol. The instruction transmitting means may be configured to transmit the at least one instruction using a connectionless and/or unreliable protocol. The connectionless protocol may comprise a connectionless transport layer protocol.

The system may further comprise means for monitoring a signal level within a further aircraft system, and the instruction transmitting means may be configured to transmit the at least one instruction in dependence on the signal level.

The system may further comprise a connection to a further aircraft system and means for monitoring a signal level at the connection, and the instruction transmitting means may be configured to transmit the at least one instruction in dependence on the signal level at the connection.

In a further, independent aspect of the invention there is provided a content distribution system for an aircraft comprising:—a server; a plurality of clients; and means for monitoring a signal level within a further aircraft system, wherein the server comprises means for transmitting at least one instruction to the clients, and the instruction transmitting means is configured to transmit the at least one instruction in dependence on the signal level within the further aircraft system.

The instruction transmitting means may comprise a processing resource, for example a suitably programmed processor, and associated wired or wireless transmission circuitry.

The further aircraft system may comprise a passenger address system and/or may form part of a passenger service system. The further aircraft system may be a pre-existing aircraft system and/or may be configured to operate substantially independently of the content distribution system.

The further aircraft system may comprise a communication system. The communication system may comprise an intercom system.

The instruction transmitting means may be configured to transmit the at least one instruction in response to a change in the signal level at the connection and/or in dependence on comparison of the signal level with a predetermined threshold.

The system may further comprise a ground loop suppression device between the server and the further aircraft system. Thus, the server may be installed as a distinct component from the further aircraft system (thus meaning that the further aircraft system can be left substantially unmodified making installation and certification more straightforward) whilst avoiding interference problems from electrical ground loops that can occur between distinct components in aircraft environments. Ground loop problems can be significant in aircraft as the motion of the aircraft through the atmosphere can cause potential differences between different points on the aircraft frame, making establishment of a common ground level difficult.

In a further independent aspect of the invention there is provided a content distribution system for an aircraft comprising:—a server; a plurality of output devices; and a plurality of clients, each client being associated with a respective at least one output device, wherein the server is configured to distribute content to the plurality of clients for output on the output devices, and the system further comprises a ground loop suppression device between the server and at least one further aircraft system.

The server and the at least one further aircraft system may be connected to a common electrical ground. The common electrical ground may comprise an aircraft bus bar.

The content distribution means may comprise at least one wireless transmission device, and each client may comprise at least one wireless receiver.

Each wireless receiver and the at least one wireless transmission device may be connected to a common electrical ground.

In a further independent aspect of the invention, there is provided a content distribution system for an aircraft comprising:—a server; a plurality of output devices, each comprising a respective wireless receiver; and at least one wireless transmission device for distributing content from the server to the plurality of output devices via the wireless receivers, wherein each wireless receiver and the at least one wireless transmission device are connected to a common electrical ground.

The common electrical ground may comprise an aircraft bus bar.

In another independent aspect of the invention there is provided a content distribution system for an aircraft comprising:—a server; a plurality of output devices; a plurality of clients, each client comprising a processor and a storage device for storage of a plurality of items of content and each client being associated with a respective at least one output device; and means for distributing the plurality of items of content to the plurality of clients for storage at each client storage device, wherein each client processor is operable to provide a selected one of the stored plurality of items of content to the associated at least one display unit.

The distribution means may be included in the server and/or may comprise components of the server and each client. Each passenger seat may comprise or be associated with a respective, different one of the plurality of output devices. The client devices may be local client devices each associated with a respective at least one passenger or seat. The server may be a central server, serving the entire aircraft. Each of the components of the content distribution system may be installed on an aircraft.

By providing for local storage of content, traffic between the server and the plurality of clients may be significantly reduced, and the reliability of delivery of selected content to the output devices may be significantly improved in comparison to systems that require real-time streaming of selected content to from a server to output devices.

The distribution means may be configured to distribute the content via wireless communication.

The system may further comprise a wireless LAN, and the distribution means may be configured to distribute the plurality of items of content via the wireless LAN.

The local storage of content can be particularly advantageous in wireless systems, as the strength and reliability of wireless connections within an aircraft environment can vary significantly with location and over time, making real time streaming of content problematic.

Content may be distributed and/or output by the system when the aircraft is in flight or on the ground.

Each client device may further comprise user input means, and the client processor may be configured to provide the selected one of the stored plurality of items of content to the associated at least one display unit in response to a user selection via the user input means.

Each client device may be configured to have a local control mode, in which the stored plurality of items of content are selectable and/or playable by the associated output device under control of the client processor.

The distribution means may be configured to distribute content according to a multicast protocol, each client may be configured to transmit at least one message to the server representative of portions of the items of content that are present or not present at that client, and the distribution means may be configured to determine from the messages portions of the items of content that are missing from at least one client and to distribute the missing portions of content to the clients according to a multicast protocol.

In a further independent aspect of the invention there is provided a method of distributing content within an aircraft comprising transmitting a plurality of items of content from a server to a client device, storing the plurality of items of content at the client device, receiving a selection of one of the plurality of items of content stored at the client device, and providing the selected item of content from the client device to a display unit.

In another independent aspect of the invention there is provided a method of distributing content comprising determining for each of a plurality of clients which portions of a plurality of items of content are present or not present at that client, determining which portions of items of content are missing from at least one client, and distributing the missing portions of content to the clients according to a multicast protocol.

The method may comprise distributing the content using a connectionless and/or unreliable protocol. The method may comprise distributing all of the missing portions of content to all of the clients. The method may comprise not distributing at least some and optionally all of those portions of items of content not identified as missing.

The method may comprise constructing a transport stream comprising the missing portions of content, and transmitting the transport stream to the clients. The method may comprise ordering the portions of content in the transport stream in dependence on the number of clients that are missing each portion of content.

The method may comprise transmitting the transport stream according to a network layer transport protocol. The method may further comprise receiving and processing the transport stream at each client according to the network layer transport protocol thereby to extract the portions of the items of content, to perform an application layer process to identify portions of content that have or have not been received, and to transmit at least one further message representative of any remaining missing portions of content.

The method may comprise monitoring for receipt of any further messages from the clients, determining from the further messages any remaining missing portions of content and redistributing the remaining missing portions of content to the clients.

The method may comprise constructing a further transport stream comprising the remaining missing portions of content, and the redistribution of the remaining missing portions of content comprises transmitting the further transport stream to the clients.

The method may comprise repeatedly monitoring for receipt of any further messages and/or repeatedly redistributing remaining missing portions of content.

The method may comprise monitoring whether each client has received substantially all portions of content and perform a further procedure at a client in response to that client having received substantially all items of content.

The method may comprise performing the further procedure at a client independently of whether one or more other of the clients have received substantially all portions of content and/or are ready to perform the further procedure.

The further procedure may comprise, or be in preparation for, entry into the local control mode.

The method may comprise providing at least one list of the portions of the items of content.

The method may comprise transmitting the at least one list to each client. The method may further comprise identify missing portions of content at each client from the at least one list, and for each client the at least one message may comprise at least one identifier identifying missing portions of content.

The method may comprise transmitting the at least one list using a connection-oriented and/or reliable protocol.

In a further independent aspect of the invention there is provided a method of transmitting instructions to a plurality of clients in an aircraft content distribution system, comprising transmitting at least one instruction to the plurality of clients in a transmission, and repeating the transmission during a transmission period, wherein each transmission is separated from the next transmission by a respective time interval, and at least some of the durations of the time intervals between transmissions are different from each other.

The method may comprise selecting the durations of the time intervals from a distribution and/or using an algorithm. The durations of the time intervals may be substantially random.

The method may comprise transmitting at least one test message to the clients, and repeating the transmission of the at least one test message during a transmission period, wherein each transmission of the test message is separated from the next transmission of the at least one instruction by a respective time interval. The method may further comprise transmitting a test message acknowledgement in response to receipt of a test message.

At least some of the durations of time intervals between transmissions of the test messages may be different from each other.

The method may comprise varying. at least one parameter of the test messages, or the durations of time intervals between the test messages, or at least one parameter of an algorithm that may be used to select the durations of the time intervals, to determine the effect of the variation on the rate of successful receipt of the test message, thereby to select the time intervals and/or the distribution and/or the algorithm used to determine the time intervals for transmission of the at least one instruction.

The at least one instruction may comprise time data identifying a start time for performance of the at least one instruction. The start time may be after the end of the transmission period. The method may comprise streaming an item of content to the clients at or after the start time. The at least one instruction may comprise an instruction to pause playing of content.

The method may comprise transmitting an item of content and the at least one instruction may comprise an instruction to play the item of content. The method may comprise transmitting the at least one instruction using a multicast protocol. The method may comprise transmitting the at least one instruction using a connectionless and/or unreliable protocol.

In another independent aspect of the invention there is provided a method of transmitting instructions in a content distribution system for an aircraft, wherein the content distribution system comprises a server and a plurality of clients, and the method comprises monitoring a signal level within a further aircraft system and transmitting at least one instruction to the clients in dependence on the signal level within the further aircraft system.

The further aircraft system may comprise a communication system, for example an intercom system.

The method may comprise transmitting the at least one instruction in response to a change in the signal level and/or in dependence on comparison of the signal level with a predetermined threshold. The at least one instruction may comprise an instruction to pause the playing of content or may comprise an instruction to resume the playing of content.

In another independent aspect of the invention there is provided a client device for use in an aircraft entertainment system, the client device comprising a processor, a storage device for storage of a plurality of items of content, and means for receiving a selection selecting a stored item of content, wherein the processor is configured to output the selected item of content from the storage device in response to the selection.

In another independent aspect of the invention there is provided a server for use in an aircraft entertainment system, the server comprising means for receiving messages from a plurality of clients identifying items of content or portions of items of content that are present or not present at each client, means for determining from the messages which items of content or portions of items of content are missing from at least one client, and means for transmitting the missing items of content or portions of items of content to the clients according to a multicast protocol.

In another independent aspect of the invention there is provided a client device for use in an aircraft content distribution system, comprising an application layer processor and a network layer processor, wherein the network layer processor is configured to receive a transport stream comprising a plurality of portions of items of content and to process the transport stream according to a network layer transport protocol thereby to extract the portions of items of content, and the application layer processor is configured to compare the received portions of items of content to a list of expected portions of items of content, to identify any missing portions of items of content, and to transmit at least one message to a server identifying the missing portions of items of content.

In another independent aspect of the invention there is provided a server for use in an aircraft content distribution system, comprising a processor and transmission circuitry for transmitting instructions to a plurality of clients, the processor being configured to transmit at least one instruction to the plurality of clients in a transmission via the transmission circuitry, to select a plurality of transmission times during a transmission period, and to repeat the transmission at each of the transmission times, wherein each transmission time is separated from the next transmission time by a respective time interval, and at least some of the durations of the time intervals between transmissions are different from each other.

In another independent aspect of the invention there is provided a server for use in a content distribution system for an aircraft, comprising means for monitoring a signal level within a further aircraft system and means for transmitting at least one instruction to at least one client in dependence on the signal level within the further aircraft system.

In another independent aspect of the invention there is provided a computer program product comprising computer readable instructions executable to put into effect a method as claimed or described herein.

Any feature in one aspect of the invention may be applied to other aspects of the invention, in any appropriate combination. In particular, apparatus or system features may be applied to method features and vice versa.

BRIEF DESCRIPTION OF THE DRAWINGS

At least one embodiment of the invention will now be described, by way of example only, with reference to the accompanying drawings, in which.

DETAILED DESCRIPTION OF EMBODIMENTS

Figure 1:
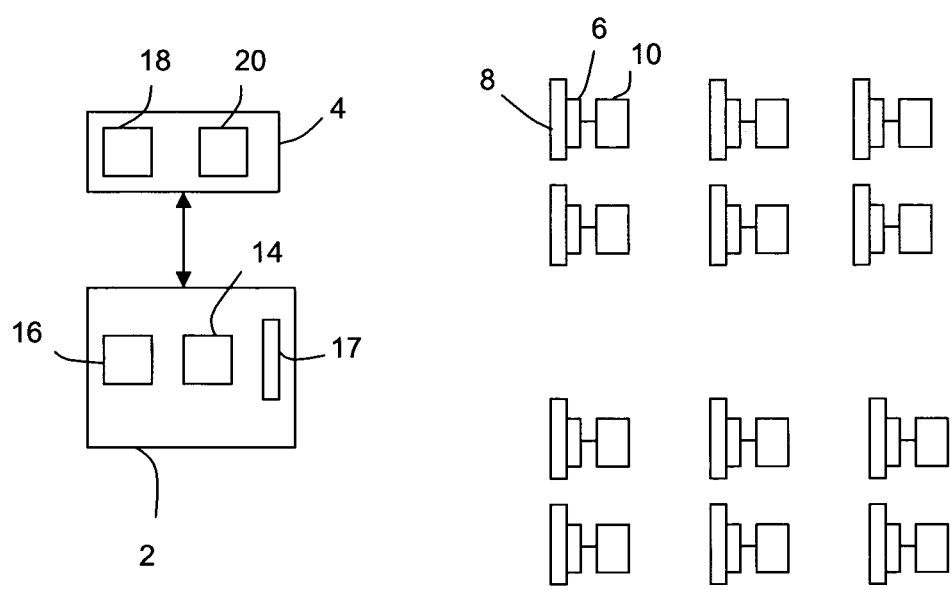
FIG. 1 is a schematic illustration of a content distribution system for an aircraft.

A content distribution system for an aircraft is illustrated in overview in FIG. 1. The system comprises a content server 2 that is connected via a wired connection to a cabin management terminal (CMT) 4.

The system also includes a display 6 installed in the back of each passenger seat 8 of the aircraft. Each display 6 is connected to a client device 10 that may be used to control operation and streaming of content to the display 6. The client device may be connected to a user input device (not shown) that can, for example, be stowed in the arm rest of the seat and can provide user control of operation of the client device and display, and the selection and viewing of content by the user. The display 6 may include a touch-screen and in that case user control may be provided by interlinked menus and soft buttons displayed on the touch-screen.

In the embodiment of FIG. 1, the display 6 is detachably housed in a screen mount on the seat back and includes a power connector that allows it to draw power from a pre-existing in-seat power supply. The client device 10 is also connected to the pre-existing power supply.

The screen mount may be a standard screen mount or may be a custom mount, for example developed in consultation with an airline's seat manufacturer. The in-seat power supply may be provided and certified for use on an aircraft under the STC (supplemental type certification) requiring both FAA and EASA on most airframes (dependent on route network).

In an alternative embodiment, the display 6 and the client device 10 are combined in an integrated hand-held unit. In that case, the power is provided by an integrated battery unit (not shown).

The server comprises a control processor 14, a data store 16 for storing content and a communications interface 17 for communication with the client devices 10 via a wired or wireless LAN. The data store 16 stores items of content (which may also be referred to as media items) such as films, TV programmes, safety videos, music, games or other software, synopsis data and preview clips for distribution to the client devices 10 and subsequent streaming to the displays 6 for viewing or listening by users. The communications interface comprises an 802.11b/g interface.

The cabin management terminal 4 includes a processor 20 and a touch-screen display 18. The cabin management terminal 4 is linked to the content server 2 and provides a control interface enabling the crew or other airline personnel to control operation of aspects of the content distribution system. The processor 20 includes an operating system and executable software that provides control and maintenance functions, including control of content and software upload to the content server 2, control of distribution of content or software to the client devices 10, and configuration management. Other examples of functions provided by control of the CMT include fault and status checking of the content distribution system, entry of flight information for distribution to and display by the client devices 10 and displays 6, and control of streaming of the safety demonstration video to the client devices 10.

The CMT software may be customized to suit the requirements of any particular aircraft installation.

In certain embodiments, the components of the content distribution system are primarily commercial off-the-shelf components, suitably programmed or otherwise configured. The content distribution may thus be classified for use in-flight with reduced certification requirements. For example, if classified as a Class 2 system, it may require only an STC and not OEM certification, meaning that certification time is reduced from years to months. The content distribution system may also be installed on a stand-alone basis, for example so as to not affect operation of, or without being integrated with, passenger service systems or other aircraft systems, which can reduce installation and maintenance requirements.

Figure 2:
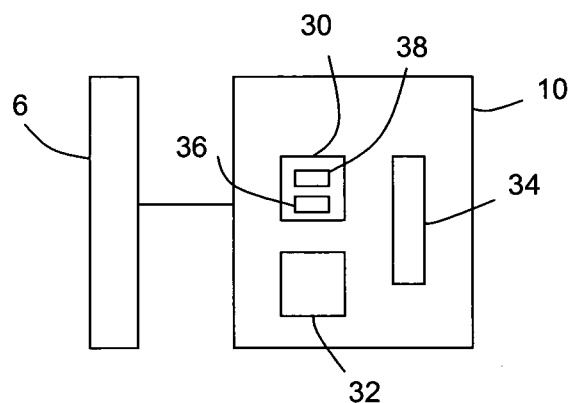
FIG. 2 is a schematic illustration of a display and a client device included in the content distribution system of FIG. 1.

A display 6 and associated client device 10 is illustrated in more detail in FIG. 2. The display 6 in the embodiment of FIG. 1 is a 7", 16:9 ratio active matrix TFT (800×480) wide screen, which can include Splendid Video Intelligence Technology. The display 6 is linked to the client device 10 via a standard VGQA or HDi interface cable. An additional screen can be linked to the client device 10 via the interface cable as well as or instead of the display 6. The client device 10 can deliver a HD quality 1600×900 32 Bit colour video resolution and can support video output to screen sizes up to 50". Therefore custom screen options may be supported on request from an airline without any degradation in video quality and without additional equipment other than the additional screen itself.

The client device 10 includes a processor 30, memory 32 for storage of content, and a communications interface 34 for communication with the content server 2 via a wired or wireless LAN.

In the embodiment of FIG. 1, the processor is an Intel® ULV Celeron® 900 MHz M Processor with the Intel® 910GML chip set, on which is installed the Microsoft XPe (embedded) operating system, which provides a small footprint, fast loading operating system that can be tailored to specific applications providing a stable and secure operating platform. The following applications and frameworks are integrated into the XPe image: Windows DotNet 1.1 SP1, Windows Media Player 10, Disk Encryption software, and video codecs for digital media. It can be understood that the client device may be a PC-type device, for example an ultra-mobile PC (UMPC).

The processor 30 includes application software developed under the Microsoft .Net platform using the C# language. The software runs on top of the secure Windows XPe OS, and use the Windows Media Player 10 component to handle all media playback and Windows Digital Rights Management for securing video and audio content. The application software manages a local database that is used to retain the menu/navigation hierarchy, location paths and usage statistics of all items of content that are stored in the content memory 32.

The application software includes a download management module 38 for managing the download and storage of content at the client device 10, and a content and display management module 36 for managing the selection and playback of items of content stored at the client device 10 and operation of the display 6.

Playback of audio & video content is managed by the Microsoft Windows Media Player 10 ActiveX component, under control of the content and display management module 36. That provides fully supported playback and license acquisition of Microsoft DRM protected WMV and WMA content, support for the playback of mixed language tracks, enabling the user to toggle-select between multiple languages whenever the current film supports it (the media player always start a film with the default language), the playback of subtitled films and CC versioning, support for the use and installation of multiple codecs allowing any existing and future media files and DRM enhancements to be supported, and support for Windows updates, keeping the Microsoft platform and DRM facility secured and fully patched.

The memory 32 for storage of content comprises two external USB2 hard-disks, which are physically secured to the seat in an enclosed layer, and provide a capacity of 320 Gb of encrypted media content space of (based on available 5200 rpm 3.5" disk technology). In the alternative, portable embodiment the memory 32 comprises a 60 Gb hard drive. The client device 10 also includes 256 MB DDR 533 MHz, and a SODIMM socket enabling memory expansion up to 768 MB DDRII-667 DRAM.

The communications interface 34 is an integrated 802.11b/g interface, which enables communication with a wireless LAN operated by the server 2. An on-board 10/100 LAN interface may also be provided to provide wired LAN functionality.

The client device 10 also includes an Intel® GMA 900 video graphics processor, which supports resolutions up to 1600×900, a push/pull type SD card slot, and various additional inputs and outputs, including an R2H Port Bar connector for external hub (S/PDIF, VGA, DC-in, 3 USB, LAN), VGA function support via VGA Cabling, two USB 2.0 A ports, one mini-USB2.0 A port, a microphone socket, a headphone socket, a built-in mono speaker, an audio/video (AV) output and a RJ45 LAN port.

The client device 10 includes a 12V-35V DC power input for connection to the in-seat power supply, and a 12V DC, 3 A, 36 W power output.

The portable embodiment of the client device 10 includes a battery unit with 4 hour or 10 hour life, which is rechargeable via a 100-240V AC, 50/60 Hz universal input. The portable embodiment also includes various LED status indicators (Power on/Suspend; LED off (Battery Full)/LED on (Charging)/Low(LED sparkle); HDD; WLAN enabling;

Bluetooth). The portable embodiment is provided in an integral housing, including the display 6, of dimensions 234 mm×133 mm×28 mm (W×D×H) and has a weight of around 830 g.

Figure 3:
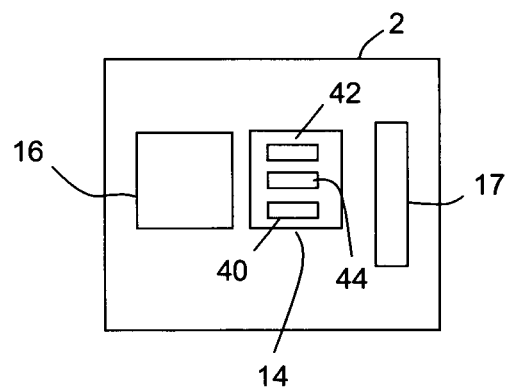
FIG. 3 is a schematic illustration of a server included in the content distribution system of FIG. 1.

The content server 2 is illustrated in more detail in FIG. 3. The processor 14 includes installed application software that comprises a control module 40, a batch content loader (BCL) 42 and an SQL server module 44. The SQL server module 44 comprises a database of all items of content stored on the content server data store 16 and on the client devices 10, and their locations. The batch content loader 42, in combination with the control module 40 and communications interface 17 make up a distribution sub-system that provides means for distributing content to the client devices 10. Other components or combinations of components may make up the distribution sub-system, providing a means for distributing content, in alternative embodiments. For example, the distribution sub-system may comprise a dedicated distribution module within or separate from the processor 14.

It is an important feature of the embodiment of FIG. 1 that items of content can be stored locally, at the client devices 10, and can then be selected and streamed from the client devices 10 to the displays 6, for example by operation of the content and display management module 36. In order to provide that feature, the items of content must firstly be distributed and stored at each of the client devices 10. In particular in the case of a in-aircraft wireless system, in which content may be distributed via a wireless LAN, it is important that the content are delivered as efficiently and reliably as possible, subject to the power and bandwidth constraints of such in-aircraft wireless systems.

The distribution sub-system is operable to provide a content transfer protocol for transferring items of content to the client devices 10. In order to reduce the data volumes that are transmitted, the distribution sub-system distributes content using a connectionless multicast protocol, for example UDP/IP, but provides additional acknowledgement and redistribution procedures to ensure that all content is received by the client devices 10 correctly.

The control processor 14 of the content server 2 maintains a media list of items of content that are to be stored on each of the client devices 10. For example, for a particular flight route and period of time (for example a particular month) a predetermined program of items of content (for example, a predetermined set of films, TV programmes and games) is usually provided to passengers. The program of items of content is often printed in an in-flight magazine provided to passengers.

The items of content are stored in the content memory 32 of each client device 10, for subsequent user selection and playback. Therefore, it is necessary to ensure that all of the items of content on the media list are transferred to the client devices 10 from the content server 2. A content distribution process is provided by the server 2, which ensures that all necessary items of content are delivered to the client devices 10.

The content distribution process may be performed each time a program of content is changed, for example monthly for a particular aircraft on a particular route. Alternatively, the content distribution process may be performed more often, for example during pre-flight checking and maintenance processes before each flight, to ensure that the correct content is stored at each client device 10. That can be particularly important if, as is often the case, an aircraft is used on more than one route, or if the portable embodiment of the client devices is used, in which case the client devices may regularly be used on different routes or aircraft. The system may distribute and display content whilst the aircraft is on the ground or in flight.

Figure 4:
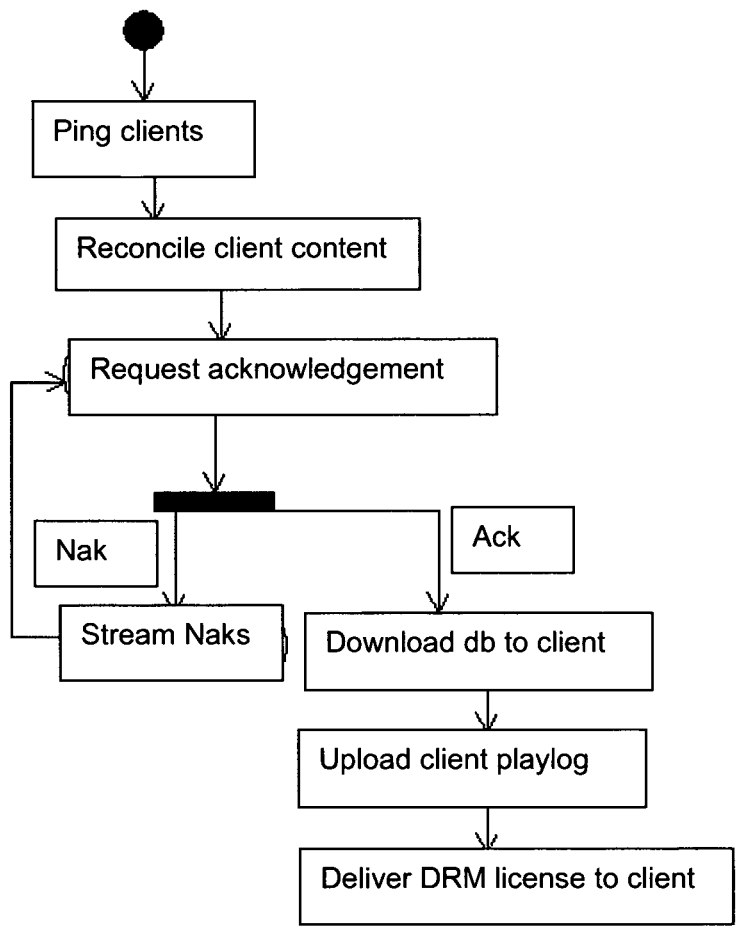
FIG. 4 is a flow chart illustrating in overview a content distribution procedure.

The content distribution process in one mode of operation is illustrated in overview in the flow chart of FIG. 4.

In the first stage of the process, the batch content loader 42 pings the LAN and makes a list of the IP addresses of client devices that reply. The batch content loader 42 then requests from each client device on the list a list of content already stored on that client device by sending a content reconciliation communication. The content reconciliation communication consists of filepaths, hashes of filepaths, file lengths and MD5 checksums of files, for the files that make up the content. The client devices determine, in an application layer process, those content files that they already have and reply with the MD5 checksum and filepath hashes of those content files. Each item of content can be made up of a plurality of files, and each file may represent a portion of an item of content. The request, and the reply from the client, is sent using a connection-oriented, reliable transport protocol such as TCP/IP.

The batch content loader 42 then compares the content stored on the client devices with the content on the media list and identifies any items of content or portions of items of content that are missing from at least one client device, and compiles a transfer list made up of such missing items of content or portions of items of content.

In some cases only some portions of a particular item of content may be missing from at least one client device. In such cases, only those missing portions rather than all portions of that item of content are included in the transfer list.

The batch content loader 42 builds a transport stream made up of the portions of content in the transfer list.

The transport stream comprises a series of UDP packets. Each item of content or portion of an item or content is broken down into sizes that will fit into a UDP packet (usually under 64 Kb), encrypted and included in a UDP packet. Each UDP packet includes a header identifying it as streamed content, an identifier, for example a filepath hash, identifying the item of content to which it belongs, a sequence number identifying the position of the portion within the item of content, and a checksum. The number of UDP packets (and thus the number of different sequence numbers) that are used to carry a particular portion of content is obtained by dividing the file length (as included in the content reconciliation communication) by the packet size, which is specified in the UDP ping message.

Figure 5:
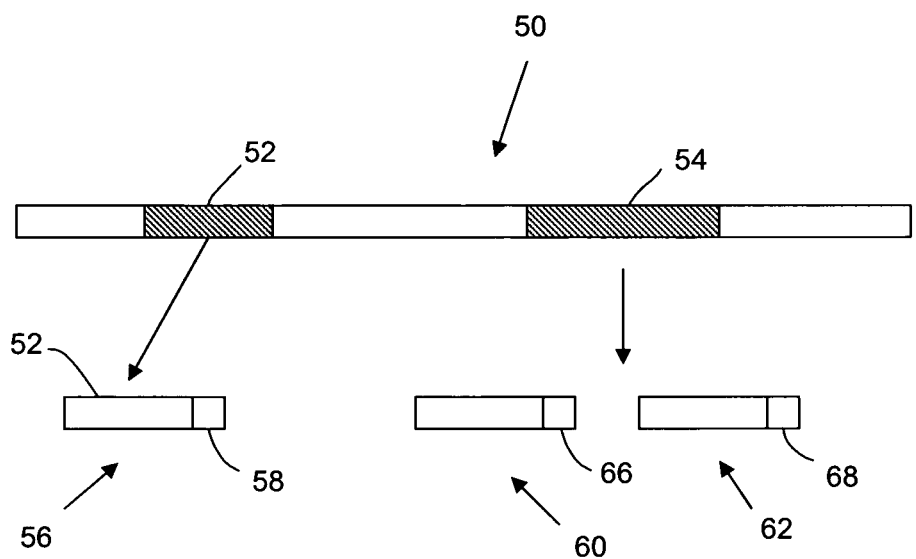
FIG. 5 is a schematic diagram illustrating the insertion of portions of missing content into transport packets.

An example of an item of content stored at the server 10 is illustrated schematically in FIG. 5. The item of content comprises a plurality of portions. One of the portions 52 is identified as missing by a single client device, and the other portion 54 is identified as missing by all of the client devices. Therefore both portions of content are included in the transfer list. The portion of content 52 is MD5 checksummed and included in a UDP packet 56 that includes a header 58. The portion of content 54 contains more data than can be included in a single UDP packet, and so is split across two UDP packets 60, 62 that include headers 66, 68.

The UDP packets may be ordered in the transport stream in order of which content or portions of content are most requested by client devices 10. For example, a packet containing a portion of content requested by only one client device 10, such as UDP packet 56, will be or near at the back of the transport stream, whereas a packet containing a portion of content requested by all of the client devices 10, such as UDP packet 60, will be at or near the front of the transport stream. UDP packets containing portions of content from one item of content (for example, a TV program or film) may be interspersed within the transport stream with UDP packets containing portions of content from another item of content (for example, another TV program or film) depending on the number of requests from client devices for the different portions of content.

The batch content loader 42 then multicasts the transport stream to the LAN using the UDP/IP protocol. By using a connectionless, unreliable multicast protocol such as UDP/IP the traffic on the LAN can be reduced.

Each client device 10 receives the transport stream via the wireless LAN, processes the received packets according to the UDP/IP protocol, and stores the portions of data in the memory 32. Ideally all client devices 10 receive all of the transport stream correctly first time. However, in practice for a wireless LAN, particularly in an aircraft environment, some or all of the transport stream may not be received correctly by all client devices 10 as the strength and reliability of the wireless connection with the server 2 can vary between different locations within the aircraft, between client devices 10 and over time.

The batch content loader 42 transmits to the client devices 10 a request for acknowledgement of receipt of the portions of content included in the transport stream. The request for acknowledgement comprises a command byte specifying an acknowledgement request and a packet MD5 checksum, and is transmitted via UDP with a rolling acknowledgement window.

Each client device identifies any portions of content that have not been received. The identification of such portions of content that have not been received is performed at the application layer, rather than at the transport layer. Each client device 10 transmits one or more non-acknowledgement (NAK) messages in respect of any portions of content from the transfer list that it has not received. If a client device 10 has successfully received all portions of content from the transfer list then it transmits an acknowledgement (ACK) message. The NAK and ACK messages are sent from client devices 10 to the server via TCP.

The batch content device 42 then prepares a new transport stream containing only those portions of content in respect of which one or more non-acknowledgement messages have been received. Again the transport stream is arranged in order of the number of received requests, with the most requested content or portions of content first and the least requested content or portions of content last. The new transport stream is again transmitted on the LAN using the UDP/IP protocol. Alternatively, the original transport stream is retransmitted on the LAN in response to receipt of the one or more NAK messages. In both modes of operation, the transport stream and the request for acknowledgement continues to be retransmitted until positive acknowledgement messages have been received from all client devices 10 (or until any remaining client devices 10 have been dropped from the list for unacceptable performance, for example if a positive acknowledgement has not been received within a certain amount of time).

The content transfer process for any particular client device 10 can be started, stopped and resumed, and client devices 10 can re-start from where they had previously left the content transfer.

Once a client device 10 has received all portions of content and has transmitted the ACK message it begins a further operation or sequence of operations. In one example, a database synchronization process is performed with the server 2, in which the batch content loader 42 downloads a dataset concerning the content to the client device via TCP as an XML-serialized stream. The client then uploads their playlogs, comprising viewing or other usage statistics for items of content, as a string via TCP to the server 2. The playlogs are written directly to a csv file at the server 2. The client device 10 then closes its TCP socket and attempts to connect to a digital rights management (DRM) server at the server 2 via http in order to undertake a DRM license acquisition process to obtain digital rights management (DRM) key information from the server 2 to enable it to playback the stored items of content.

It is an important feature of the mode of operation described in relation to FIG. 4 that client devices 10 are able to finish the content download process individually, leaving the slowest client devices 10 to continue in their own time. The multicast streaming process continues whilst individual client devices 10 that have received all content carry out the further operation or sequence of operations (for example, the synchronization and DRM key request operations).

That can be particularly advantageous in the case of wireless LAN networks in environments such as aircraft, as there can be great variability in the network performance of client devices and it can be undesirable for the performance of the slowest device to slow the content download process for all client devices. Furthermore, the mode of operation illustrated in FIG. 4 is flexible and is able to provided efficient content transfer to client devices that have different items of content stored on them.

The system can also provide an alternative mode of operation in which items of content are sent on a batch-by-batch basis, in which the next item of content or other file is only sent when all client devices 10 have confirmed receipt of the last item of content. An example of the alternative mode of operation is illustrated in overview in FIG. 6. That alternative mode of operation can be suitable for wired LANs, or other arrangements in which the network performance of each client device is similar.

As with the mode of operation described above in relation to FIG. 4, the first stage of the alternative mode of operation is to ping all client devices and to make a list of the IP addresses of the client devices that reply.

The batch content loader 42 then determines the content to be included in the transfer list by comparing the media list with xml images of client device databases that have previously been stored on the server 2.

For the first item of content on the transfer list, the batch content loader 42 breaks the item of content down into sizes which can fit into a UDP packet (under 64 kilobytes). Each such packet comprises a header identifying it as streamed content, a batch number, a sequence number, and a checksum. The content may be encrypted, for example using DES or Rijndael, or unencrypted depending on system configuration settings.

The batch content loader 42 then transmits a file initialization packet comprising a relative file path, file length and a filepath hash for the item of content, and awaits acknowledgement from all client devices 10 of receipt of the initialization message. The content reconciliation communication that is transmitted in the first mode of operation comprises similar data (filepaths, file lengths, hashes and MD5s in that case) to that of the file initialization packet, but includes such data for all items of content in a single TCP stream, whereas the file initialization packet includes such data for only a single item of content.

The batch content loader 42 then streams the UDP packets representative of the item of content to the client devices 10 using UDP/IP, and requests acknowledgement from all client devices 10 in the client list. Client devices send either a positive acknowledgement of correct receipt or negative acknowledgements (NAKs) representing missing packets. The NAKs may comprise a list of sequence numbers that are missing. The batch content loader 42 then compiles the NAKs into a resend list of the missing packets, restreams the missing packets, and again requests acknowledgement. The restreaming, and requesting of acknowledgement continues until all client devices 10 have sent positive acknowledgements or until any remaining client devices 10 have been dropped for unacceptable performance (for example, if a positive acknowledgement has not been received within a certain amount of time).

A file initialization packet for the next item of content on the transfer list is then transmitted, and that next item of content is then streamed. The process is repeated until all items of content on the transfer list have been successfully received.

After all items of content have been successfully streamed, the client devices 10 receive a common instruction from the server 2 to synchronize their local databases of content with the server database, followed by an instruction to begin the DRM license acquisition process. The synchronization process comprises uploading a list of the items of content stored on each client device (after each client device has reconciled its own database to the items of content that have been delivered) to the server 2, and storing the list as an XML image in the server content database. Alternatively, the synchronization process as described in relation to the mode of operation of FIG. 4 can be used.

Figure 6:
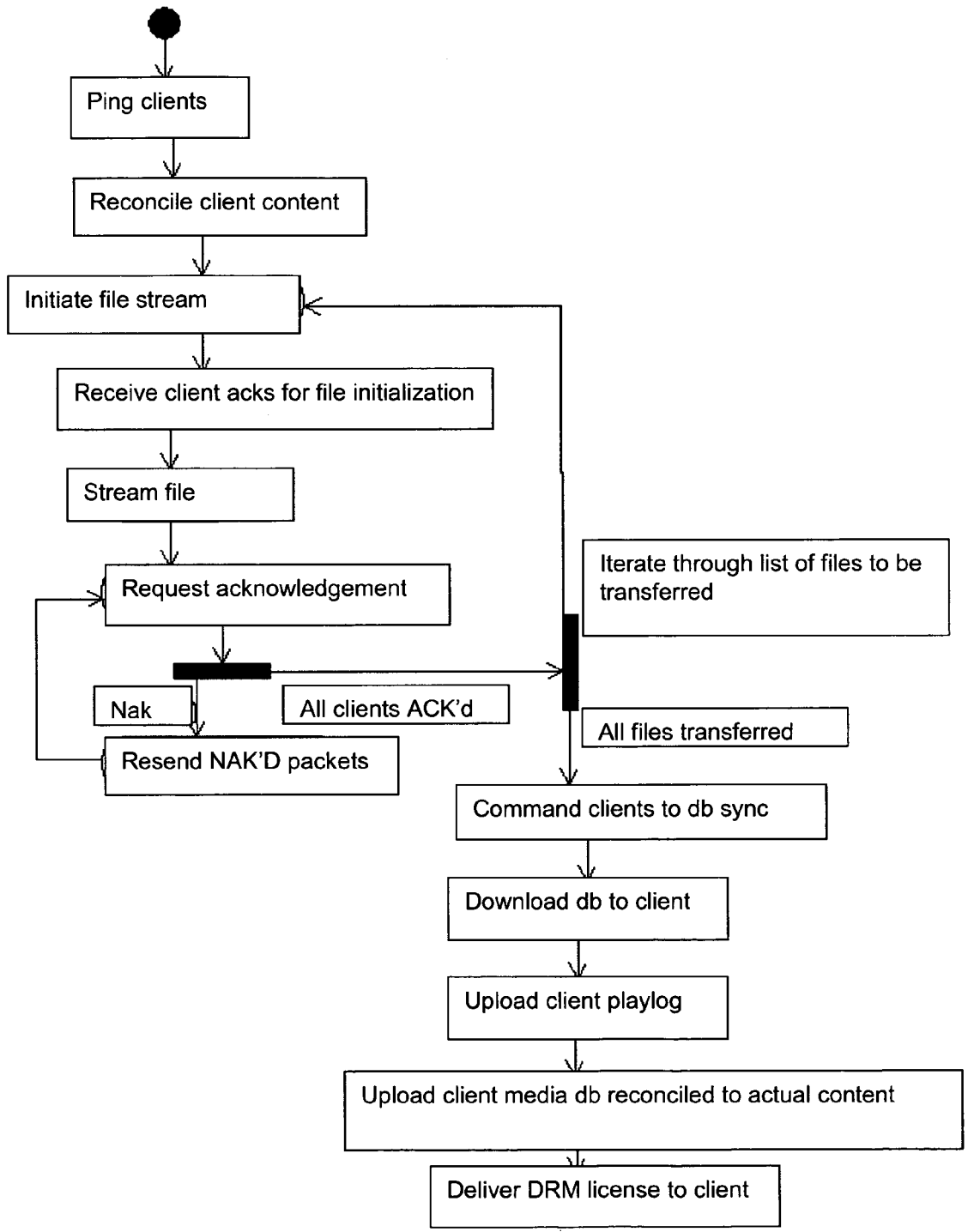
FIG. 6 is a flow chart illustrating in overview an alternative content distribution procedure.

The content transfer process of the alternative mode of operation illustrated in FIG. 6 can be started, stopped or resumed, as was the case with the content transfer process of FIG. 4. However, in the case of the mode of operation of FIG. 6, in order to do so it is necessary to perform a manual database synchronization before resuming the content transfer so as to update the xml client images at the server 2, allowing the content transfer to re-start from the item of content that it had previously stopped on.

Once the content transfer process, the database synchronization process and the license acquisition process have been completed for a client device 10, that client device 10 enters a local control state, under control of the content and display management module 36. In the local control state, control of operation of the display, and selection and playback of content stored at the client device 10 can be controlled by a user via the touch-screen of the display 6 or the user input device 12. The user can also control functions of the display 6, for example brightness, contrast and volume, via the touch-screen or the user input device 12.

Upon initial entry into the local control state, the control device processor 30 controls the display 6 to display an entry screen. If the control device 10 is in an on state, the user may enter a series of interlinked menus on the display by touching the entry screen or by pressing a key on the user input device 12. The content and display management module 36 populates the menus with data identifying the items of content stored at the client device 10, and available to the user.

Once a user has selected an item of content for playback the control device processor 10 launches a media player application, which plays the item of content to the user on the display 6. The media player application provides controls to the user to control the playing of the item of content.

To access the media controls, the user touches the screen during playing of the item of content, or presses a key on the user input device 12. The media controls then appear on the screen of the display 6. To remove the media controls the user simply touches the screen again and the controls slide off.

In one mode of operation, the media controls comprise a scroller device 70 and a control panel 72. The media controls are overlaid on the item of content that is being played, upon touching of the screen by the user. The scroller 70 and control panel 72 are illustrated in FIG. 7.

The scroller device 70 comprises a scroller 74 and a bar 76. A user is able to touch and drag the scroller 74 to any position on the bar 76 and thereby to skip forwards and backward to different positions within the item of content being viewed. The position of the scroller 74 on the bar 76 is continually updated in relation to the current position of the playback of the item of content.

The control panel 72 provides user control over several more playback features. The control panel 72 comprises various display features including a number of soft buttons that a user can operate by pressing the touch screen of the display.

Figure 7:
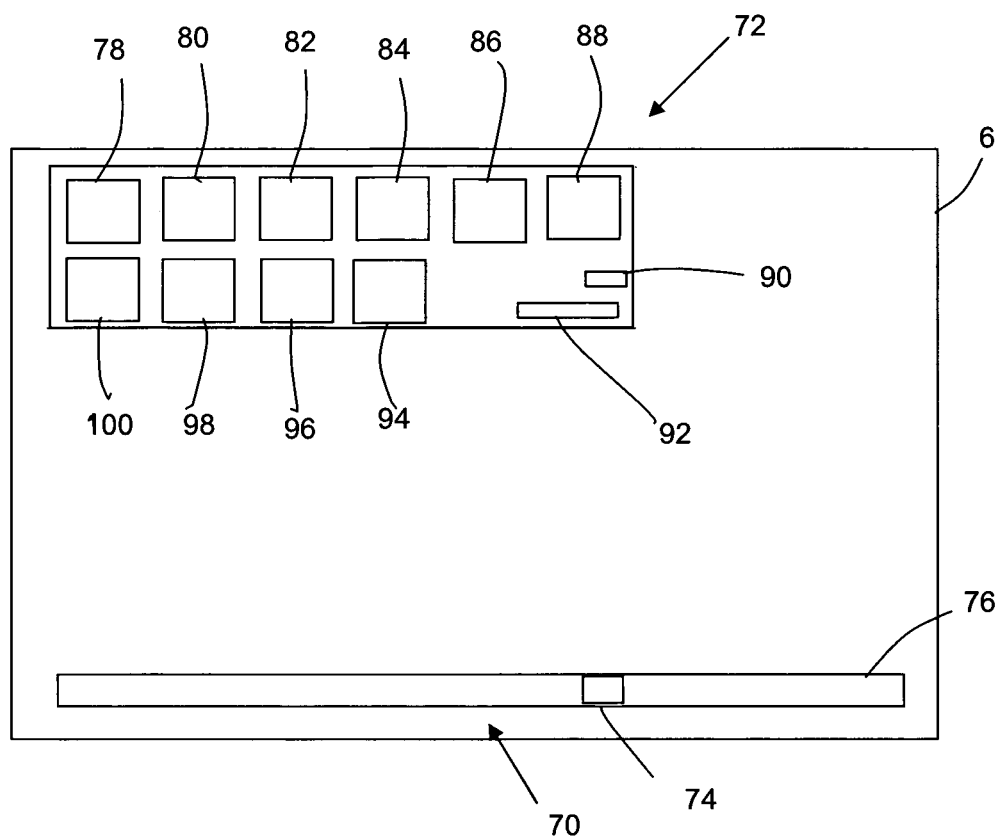
FIG. 7 is a schematic illustration of media player controls provided by the display and client device of FIG. 2.

In the embodiment of FIG. 7, the control panel includes a pause button 78, a return button 80, a full screen button 82, a screen off button 84, a previous button 86, a next button 88, a title display feature 90, a time display feature 92, an increase brightness button 94, a decrease brightness button 96, an increase volume button 98 and a decrease volume button 100.

The pause button 78 is operable to pauses the playing of the current item of content. The pause button 78 flips to become a play button when in pause mode, which when pressed causes the playing of the item of content to resume. The button 78 then reverts back to a pause button.

The return button 80 is operable to stop the playing of the current item of content and exit from the media player. The user is returned to a synopsis of the item of content.

The full screen button 82 is operable to enlarge the media player into full screen mode. The displayed item of content is enlarged but retains its original aspect ratio; the picture is not stretched out of proportion. The screen off button 84 is operable to allow the user to turn the screen off when listening to audio. The user can return back to screen display by tapping the screen once when the screen is switched off.

The previous button 86 is operable to play the last item in a current playlist, and the next button 88 is operable to play the next item in the current playlist.

The title display feature 90 displays the title of the current item of content. The time display feature 92 displays the current playback position (in minutes) and the duration of the current item of content.

The increase brightness button 94 and the decrease brightness button 96 are operable to increase and decrease the brightness of the screen respectively. The increase volume button 98 and the decrease volume button 100 are operable to increase and decrease the audio volume respectively.

As the available items of content are stored locally at each client device 10, once a client device 10 is in the local control state the selection and playback of content, and the control of functions of the display 6 can be performed locally by each client device 10, without requiring transfer of data or other communication over the LAN. However, in certain circumstances, it can also be desirable for local control of the client devices to be interrupted by the server 2. Therefore, the client devices 10 also provide state awareness functionality, enabling the state of each client device 10 to be set via a multicast command sent over the LAN by the server 2. The sending of the multicast command by the server 2 may be instructed by a cabin crew member or other operator via the cabin management terminal 4.

The multicast state commands include the following:—

Off: Closes the content and display management module 36 at the client device 10 and returns the user to the entry screen. The user has no access to the menu screens or to items of content On: Launches the content and display management module 36 at the client device 10 and allows items of content and menu screens, from the entry screen onwards, to become accessible to the user.

Pause On/Off: Pauses the playing of all current items of content, for example to allow announcements to be made by crew. The announcements may be made via the intercom and/or by the streaming of audio data from the server 2 to each client device 10. Playing of the items of content is resumed when pause is switched off by a further multicast pause on/off command.

Safety Video Play: Pauses the playing of all current items of content and opens up an instance of the media player to play a safety video. When the safety video ends, the media player closes and the user is returned back to the current item of content. The safety video may be included in the media list and stored locally at each client device 10 or may be streamed from the server 2 to each client device 10. In some cases it is desirable that the safety video is played substantially simultaneously by each client device 10, as playing of the safety video may be co-ordinated with demonstrations by crew members. Therefore, the Safety Video Play command can include time data that specifies a time when the client device 10 should begin playing the safety video. Other state commands may also include such time data specifying a time to perform one or more actions.

In addition to the multicast state function commands listed above there is also an administrator application that is launched by inserting a specifically formatted USB key into a client device 10 when the client device 10 is displaying the entry screen. Launch of the administrator application causes an admin screen to be displayed on the client device 10, which allows a crew member or other operator to update a current non-DRM protected video newscast stored at the and also set child lock preferences and allocate seat and flight numbers for use in logging passenger usage statistics.

In one mode of operation, each state command is sent to each client device 10 on the client device using a connection-oriented, reliable protocol such as TCP/IP. However, the use of such a protocol can cause delay, as the command will be resent until each client device to which it is sent has successfully acknowledged receipt. Furthermore, use of such a protocol increases network traffic as it requires the establishment of a connection between the server 2 and each client device 10, and the transmission of acknowledgement messages between the server 2 and each client device 10.

In another mode of operation, each state command is multicast onto the LAN using a connectionless, unreliable protocol, for example UDP/IP, which can be faster and require less network traffic than a connection-oriented, reliable protocol such as TCP/IP. As the protocol is connectionless, it cannot be guaranteed that a single transmission of a state command will be received correctly by all client devices, in particular when the LAN is a wireless LAN. Therefore, the server 2 is configured to repeat the multicast transmission of the state command during a transmission period of pre-determined duration.

Figure 8:
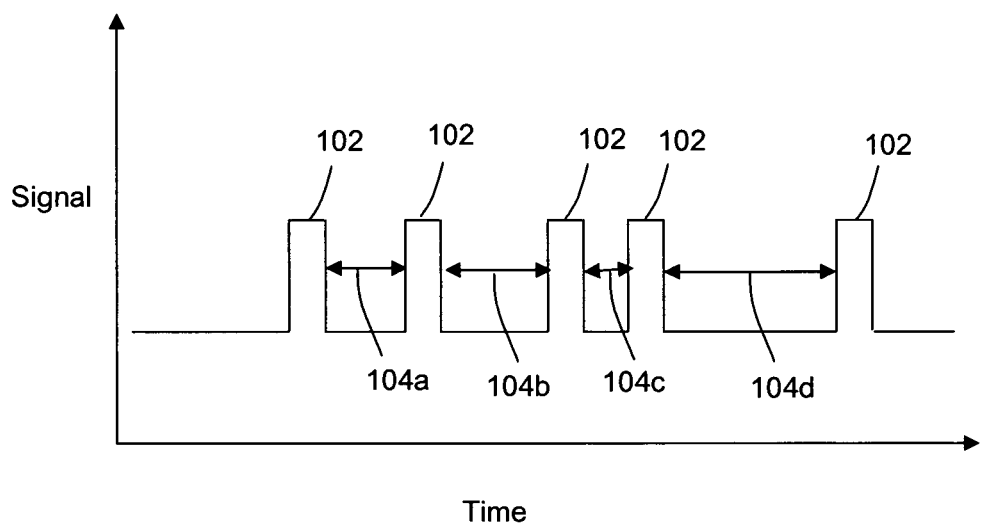
FIG. 8 is a plot of signal level versus time showing the intervals of time between successive instruction messages.

It has been found that the rate of successful receipt of state commands or other instructions or messages can be increased by ensuring that at least some of the durations of time intervals between each successive transmission are different from each other. FIG. 8 shows one example of successive transmissions of a message 102 from the server 2 to the client devices 10. The durations of the time intervals 104a, 104b, 104c, 104d between successive transmissions are different.

In one mode of operation, the server 2 uses a predetermined transmission period, and a predetermined number of repetitions of the transmission of the state command, and selects the durations of the time intervals between successive transmissions randomly or quasi-randomly. For example, the server 2 can select the durations of the time intervals randomly from a distribution (for example, a Gaussian distribution) around a pre-determined mean or median duration value. Alternatively or additionally, the server 2 can select the durations of the time intervals using an algorithm, for example a random number generating algorithm.

Time intervals, number of repetitions and transmission period can be selected by an operator via a configuration screen. In one example, a maximum time interval of 80 milliseconds, with 5 repetitions and 2 transmissions, is selected. In that case, the command is sent twice successively, followed by a waiting period or time interval of random length between 1 and 80 milliseconds. The sending and waiting process is then repeated a further 4 times, with a different randomly selected waiting period of between 1 and 80 milliseconds for each repetition.

In another mode of operation, the server 2 uses predetermined, different durations between successive transmissions.

It has been found that the rate of successful transmission in an aircraft wireless transmission system varies between types of aircraft, and even between individual aircraft of the same type.

Therefore, in one mode of operation, parameters relating to the instruction transmission process (for example, the durations of time intervals between successive transmissions, and/or properties of distributions or algorithms used to select the durations of the time intervals, and/or the duration of the transmission period and/or the number of repetitions of the transmission) are varied in a tuning procedure for a particular aircraft or type of aircraft. The variation of the rate of successful transmission to client devices in dependence on the variation of the parameters is determined, and values of the parameters that optimize the rate of successful transmission are selected for subsequent operational use, subject to any operational constraints.

As mentioned above, in some embodiments the content distribution system is installed on a stand-alone basis, without affecting operation of existing passenger service systems, which can provide for simplified installation and maintenance. An example of one such embodiment is shown in FIG. 9.

Figure 9:
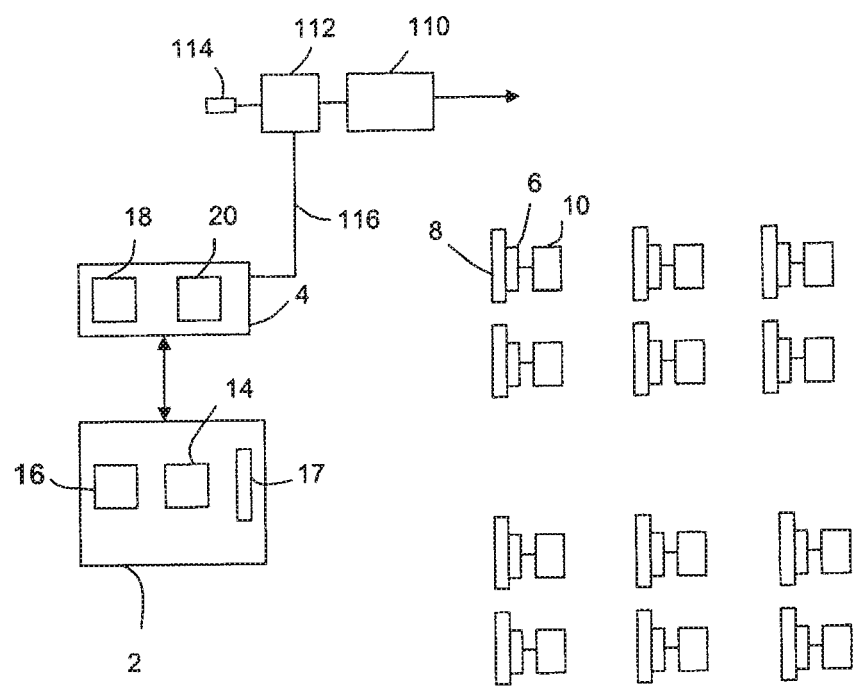
FIG. 9 is a schematic illustration of a content distribution system for an aircraft in an alternative embodiment.

It can be seen in FIG. 9 that the aircraft includes a separate passenger service system 110, linked to a flight attendant panel 112 that provides controls for controlling various aspects of the cabin environment and passenger services. The flight attendant panel 112 can comprise a set of manual switches or buttons, or can comprise a display and associated PC or other processing device. The passenger service system 110 is connected, for example, to overhead passenger service units above each seat that provide over-seat lighting, ventilation and flight attendant call facilities; to main and emergency cabin lighting; to main cabin ventilation systems; to the cabin intercom system; to emergency systems and to galley systems. Any of those components may be controlled or monitored from the flight attendant panel 112. The flight attendant panel 112 also comprises a microphone 114 into which the crew can speak to deliver audio messages via the cabin intercom system.

Figure 10:
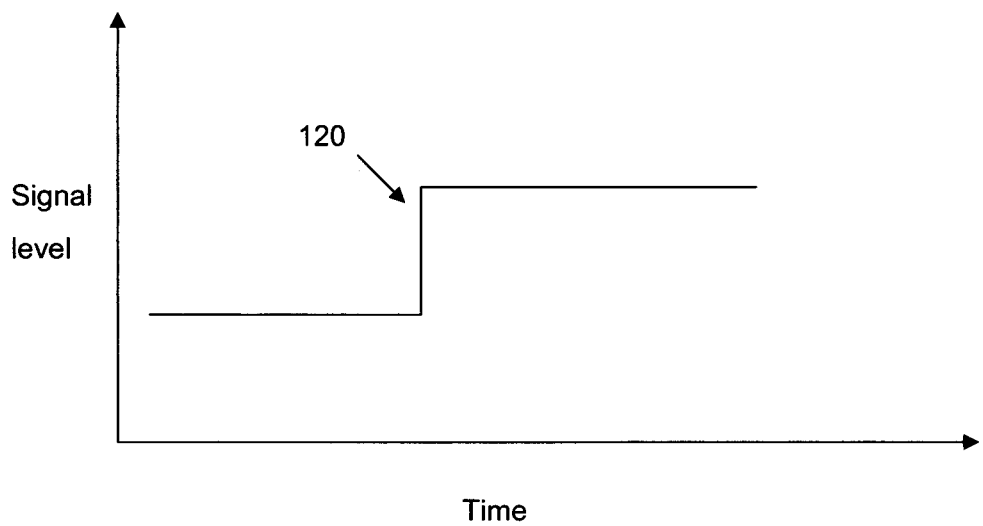
FIG. 10 is a graph of signal level versus time on a feed line connected to circuitry of an aircraft intercom system.

In the embodiment of FIG. 9, a signal line 116 is added from the existing flight attendant panel 112 to the CMT 4, or in an alternative embodiment directly to the server 2. The signal line 116 is connected to activation or other circuitry of the intercom system, for example in the signal path between the microphone 114 of the flight attendant panel 112 and the passenger service system 110, and is connected to a signal monitoring device at the CMT 4 or server 2. The signal monitoring device monitors for a change in signal level on the line which indicates that a cabin crew member or other operator has activated the intercom system or is delivering a message over the intercom system. An example of such a change in signal level is indicated schematically in FIG. 10, which is a graph of signal level versus time. A change in signal level 120 occurring upon activation of the intercom system is shown.

When the signal monitoring device detects a change in signal level indicating activation of or delivery of a message over the intercom system, it passes a message to the server processor 14, which in response transmits a Pause On/Off state command to the client devices 10 as described above. The playing of content by the client devices 10 is paused in response to the Pause On/Off state command, allowing passengers to listen to the intercom system. The signal monitoring device detects when the intercom system is subsequently deactivated or the delivery of the message has ended, from the change in signal level, and transmits a further Pause On/Off state command to instruct the client devices 10 to resume playing content.

The intercom system is usually connected to the electrical ground of the aircraft avionics. It is a feature of the described embodiments that the CMT 4 and the server 2 (which can be either separate or combined) can be installed as distinct components separate from the flight attendant panel 112, the intercom system or the aircraft avionics systems. That provides for straightforward installation, and means that certification requirements are low. However, as the CMT 4 and the server 2 may have a different electrical ground from the intercom system, ground loops can occur that can cause overwhelming interference on the signal line 116 (it has been found that such ground loops can cause variation of the voltage on the line by between 5V and 15V in some circumstances). In the embodiment of FIG. 9 an opto-isolator device is provided between the intercom system and the CMT 4 or the server 2, for example on the signal line 116, to provide for optical ground loop suppression that suppresses interference on the signal line 116. The server 2 and/or CMT 4 are also connected to the same ground, for example an aircraft bus bar, as the intercom system in some variants.

It will be understood that whilst the embodiments described herein in relation to FIGS. 1 to 10 include particular components and arrangements of those components, any suitable type and arrangement of components. For example, any suitable type of processor, server, client devices, displays and wired or wireless communication circuitry may be used in alternative embodiments.

In alternative embodiments, the content management system and the passenger service system 110 are integrated, and both passenger services and content management can be controlled from a combined CMT and FAP terminal.

In some embodiments in which the client devices 10 communicate with the server 2 via a wireless LAN or other connection, rather than via a wired LAN or other connection it has been found to be important to ensure that the client devices 10 and the server 2 (and any wireless routers or other devices on the wireless LAN transmission path) each of the client devices 10 and the server 2 is connected to an aircraft bus bar (for example an aircraft bus bar connected to the seat power systems) in order to provide an electrical ground.

The embodiments described above in relation to FIG. 1 includes displays associated with each seat. In other embodiments, any type of output device for outputting content can be provided instead of or as well as a display, for example an audio output device as well as or instead of an audio/video output device.

In the embodiments described in relation to FIGS. 1 and 9, a separate display is provided for each seat. In an alternative embodiment a client device can be used to control operation of a larger display that is for display of content to a group of passengers. In that case a single client device and single display may be provided for each group of, for example, between 20 and 40 seats. In one such example, for example for use in a private jet, a single client device may be provided on the aircraft for control operation of a single display.

In the case of the hand-held embodiment, integrated display and client devices may be handed out to passengers as they board the aircraft. In that case, only the same number of devices as there are passengers are required. Spare devices may be kept by the cabin crew in case of malfunction during a flight of any of the devices provided to the passengers.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the embodiment implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. An aircraft content distribution system comprising:
    a server installed in an aircraft that includes a plurality of passenger seats;
    a plurality of clients, each client of the plurality of the clients being configured to output content to a respective display device associated with at least one of the passenger seats; and
    a processing resource for distributing a plurality of items of content to the plurality of the clients, each client is configured to transmit at least one message to the server representative of portions of the items of content that are present or not present at each respective client, and the processing resource is configured to determine from the messages portions of the items of content that are missing from the client, and to distribute the missing portions of content to the plurality of the clients via a wireless local area network (LAN) according to a multicast protocol that is at least one of connectionless or unreliable, each client is configured to monitor whether each respective client has received substantially all portions of the content and perform a synchronization process with the sever and, independently of whether one or more other of the plurality of the clients have received all portions of the content and independently of whether the processing resource is continuing to distribute missing portions of the content, each client is configured to enter a local control mode in response to having received substantially all portions of the content and on completion of the synchronization process, each client comprises a processor and a storage device for locally storing the plurality of the items of content, for each of the plurality of the clients, in the local control mode, a user can enter a series of interlinked menus on the respective display device and said user can select one of the locally stored items of content and the processor of the client is configured to launch a media player application for playing the selected item of content to the respective display device for display in response to the user selecting one of the locally stored items of content from the interlinked menus, regardless of whether the processing resource is continuing to distribute missing portions of the content to other of the plurality of the clients, and wherein the processing resource is further configured to distribute all of the missing portions of content to all of the plurality of clients.

2. The system according to claim 1, being an aircraft content distribution system, wherein the server is installed in an aircraft comprising the plurality of the passenger seats, and each client is configured to output content to a respective output device associated with at least one passenger seat.

3. The system according to claim 1, wherein the processing resource is configured to construct a transport stream comprising the missing portions of content, and the distribution of the missing portions of content comprises transmitting the transport stream to the plurality of the clients.

4. The system according to claim 3, wherein the processing resource is configured to order the portions of content in the transport stream in dependence on the number of clients that are missing each portion of content.

5. The system according to claim 3, wherein the processing resource is configured to transmit the transport stream according to a network layer transport protocol, each client is configured to receive and process the transport stream according to the network layer transport protocol thereby to extract the portions of the items of content, to perform an application layer process to identify portions of content that have or have not been received, and to transmit at least one further message representative of any remaining missing portions of content.

6. The system according to claim 1, wherein the processing resource is configured to monitor for receipt of any further messages from the plurality of the clients, to determine from the further messages any remaining missing portions of content and to redistribute the remaining missing portions of content to the plurality of the clients.

7. The system according to claim 6, wherein the processing resource is configured to construct a further transport stream comprising the remaining missing portions of content, and the redistribution of the remaining missing portions of content comprises transmitting the further transport stream to the plurality of the clients.

8. The system according to claim 1, wherein the processing resource is configured to repeatedly monitor for receipt of any further messages and to repeatedly redistribute remaining missing portions of content.

9. The system according to claim 1, wherein each client is configured to monitor whether each respective client has received substantially all portions of content and to perform a further procedure in response to having received substantially all items of content, wherein optionally the further procedure comprises or is in preparation for entry into a local control mode.

10. The system according to claim 9, wherein each client is configured to perform the further procedure independently of whether one or more other of the plurality of the clients have received substantially all portions of content or are ready to perform the further procedure.

11. The system according to claim 9, wherein each client is configured to perform the further procedure independently of whether the processing resource is continuing to distribute missing portions of content.

12. The system according to claim 1, wherein the processing resource is configured to distribute content using a connectionless or unreliable protocol.

13. The system according to claim 1, wherein the processing resource is configured to not distribute at least some and preferably all of those portions of items of content not identified as missing.

14. The system according to claim 1, wherein the processing resource is configured to provide at least one list of the portions of the items of content, and optionally the server is configured to transmit the at least one list to each client, each client is configured to identify missing portions of content from the at least one list, and for each client the at least one message comprises at least one identifier identifying missing portions of content, and further optionally the server is configured to transmit the at least one list using a connection-oriented and/or reliable protocol.

15. The system according to claim 1, wherein each client comprises a processor and a storage device for storage of the plurality of the items of content and each client of the plurality of the clients is associated with a respective at least one output device; and each client processor is operable to provide a selected one of the stored plurality of the items of content to the associated display unit.

16. A method of distributing content within an aircraft, wherein the aircraft includes:
  a server;
  a plurality of passenger seats;
  a plurality of clients, each client of the plurality of the clients being configured to output content to a respective display device associated with at least one of the passenger seats, wherein the method comprises:
  distributing a plurality of items of content to the plurality of clients, wherein transmitting by each client a message representative of portions of the items of content that are present or not present at each respective client;
  determining for each of the plurality of the clients which portions of a plurality of items of content are present or not present at each respective client, determining which portions of items of content are missing from the client, and distributing the missing portions of content to the plurality of clients according to a multicast protocol via a wireless local area network (LAN) that is at least one of connectionless or unreliable;

monitoring by each client whether each respective client has received substantially all portions of content and performing a synchronization process with the server and, independently of whether one or more other of the plurality of clients have received all portions of the content and independently of whether missing portions of content are continuing to be distributed, entering a local control mode by the client in response to having received substantially all items of content and on completion of the synchronization process, for each of the plurality of the clients, in the local control mode, displaying a series of interlinked menus on the respective display device and receiving a selection of one of the locally stored items of content and launching a media player application for playing the selected item of content to the respective display device for display in response to receiving the selection of one of the locally stored items of content from the interlinked menus, regardless of whether missing portions of the content are continuing to be distributed to other of the plurality of the clients, and wherein the distributing the plurality of the items of the content to the plurality of clients comprises distributing all of the missing portions of the content to all of the plurality of clients.

17. A server for use in an aircraft entertainment system, the server comprising a processing resource configured to receive messages from a plurality of clients identifying items of content or portions of items of content that are present or not present at each client, to determine from the messages which items of content or portions of items of content are missing from the client, and to transmit the missing items of content or portions of items of content to the plurality of the clients according to a multicast protocol, wherein
   each client is configured to monitor whether each respective client has received substantially all portions of content and preform a synchronization process with the server and to enter a local control mode in response to having received substantially all items of content and on completion of the synchronization process,
   wherein each client comprises a processor and a storage device for locally storing the plurality of items of content,
   wherein for each client of the plurality of the clients, in the local control mode, a user can enter a series of interlinked menus on the respective display device and the user can select one of the locally stored items of content and the processor of the client is configured to launch a media player application for playing the selected item of content to the respective display device for display in response to the user selecting one of the locally stored items of content from the interlinked menus, and
   wherein the server is configured to continue to distribute missing items of content or portions of item of content according to the multicast protocol regardless of whether one or more of the plurality of the clients have entered their local control mode and the server is further configured to distribute all of the missing portions of the content to all of the plurality of clients.

18. A client device for use in an aircraft content distribution system, comprising a processor configured to receive a transport stream comprising a plurality of portions of items of content via a wireless local area network (LAN) according to a multicast protocol that is at least one of connectionless or unreliable and to process the transport stream according to a network layer transport protocol thereby to extract the portions of items of content, and the processor is further configured to compare the received portions of items of content to a list of expected portions of items of content, to identify any missing portions of items of content, and to transmit at least one message to a server identifying the missing portions of items of content, wherein
   the client device is configured to monitor whether each respective client has received substantially all portions of content and perform a synchronization process with the server, independently of whether one or more other client devices have received all portions of the content and independently of whether missing portions of content are continuing to be distributed to other client devices, the client device is configured to enter a local control mode in response to having received substantially all items of content and on completion of the synchronization process,
   wherein the client device comprises a storage device for locally storing the items of content,
   wherein in the local control mode, a user can enter a series of interlinked menus on the respective display device and select one of the locally stored items of content and the application layer processor of each client is configured to launch a media player application for playing the selected item of content to the respective display device for display in response to the user selecting one of the locally stored items of content from the interlinked menus, regardless of whether the processing resource is continuing to distribute missing portions of the content to other of the plurality of the clients, and wherein all of the missing portions of the content are distributed to all of the clients.

19. An article of manufacture including a non-transitory, tangible computer readable storage medium having instructions stored thereon that, in response to execution by a computer-based system, cause the computer-based system to perform operations according to the method of claim 16.

* * * * *